(No Model.)

E. FLOTRON.
STEM FASTENER FOR WATCHES.

No. 560,898. Patented May 26, 1896.

Witnesses
Chas. H. Smith
J. Staib

Inventor
Emile Flotron
per Lemuel W. Serrell
Atty.

ANDREW B. GRAHAM, PHOTO-LITHO. WASHINGTON, D.C.

UNITED STATES PATENT OFFICE.

EMILE FLOTRON, OF MADRETSCH, SWITZERLAND.

STEM-FASTENER FOR WATCHES.

SPECIFICATION forming part of Letters Patent No. 560,898, dated May 26, 1896.

Application filed October 11, 1895. Serial No. 565,335. (No model.)

*To all whom it may concern:*

Be it known that I, EMILE FLOTRON, manufacturer, a citizen of the Republic of Switzerland, residing at Madretsch, canton of Bern, Switzerland, have invented certain new and useful Improvements in Stem - Winding Watches, of which the following is a specification.

The invention consists of an improved stem to be used in those watches which are provided with an inner case holding the watch mechanism and affixed to an external case by means of interlocking projections at one side of the inner case and on the other side by a stem passing through the shank and engaging the inner case and the winding-stem of the watch mechanism.

My improved stem is provided with locking devices to lock the stem passing through the shank with the winding-stem in the inner case and to allow the said stem to be unlocked when the inner case, containing the watch-movement, is to be removed out of the external case. To that effect my improved stem is provided with a lateral locking-spring having a hooked end to engage a circular groove in the inner stem and having, further, a nose projecting into the inner part of the stem and adapted to be acted upon by a central pin, the conical end of which presses the said nose or projection outwardly when a pusher affixed to the central pin is depressed for the purpose of disengaging the hooked end of the locking-spring from the circular groove of the inner stem.

In view of having the invention better understood I will proceed to describe the same with reference to the accompanying drawings, in which—

Figure 1:
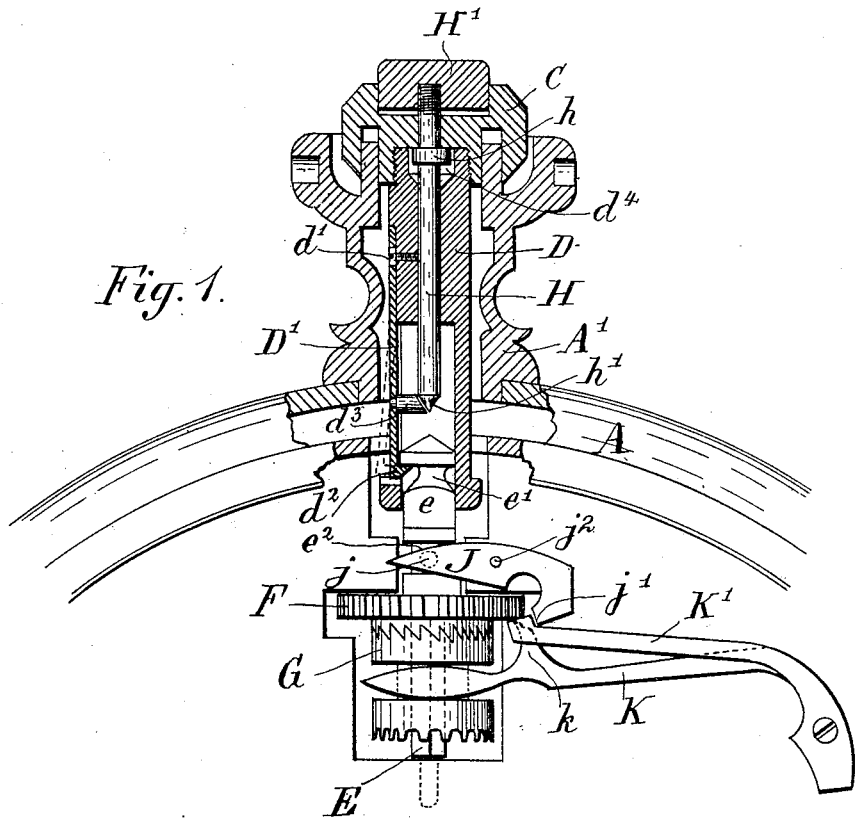
Figure 2:
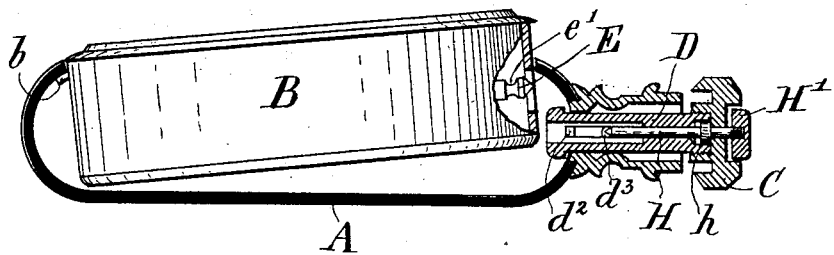

Figure 1 is an axial section of my improved stem and of the shank. Fig. 2 shows, at a reduced scale, a similar section of the stem, the shank, and the external case, with the inner case partially entered into the said external case.

A is the external case, and B the inner one, which contains the watchwork. The latter comprises an inner winding-stem E, the square end $e$ of which is provided with a circular groove $e'$. On the said stem E there is the usual winding-up wheel F, turning freely on a cylindrical portion of the stem, and the usual sliding pinion G on a square portion of the stem E. A rocking lever J has its pin $j$ in a circular groove $e^2$ of the stem E, and a rocking lever K, having its end within the circular groove of the sliding pinion G, has its arm $k$ acted upon by the said rocking lever J.

K' is a spring hooking its beveled head-piece to the rocking lever J, so as to hold the same in either of its positions. It will now be readily understood that in retracting the stem E the lever J will be caused to rock upon its pivot $j^2$ and that its arm $j'$ will depress the arm $k$ of the lever K, so as to separate the teeth of the sliding pinion G from the teeth of the wheel F, as is usually done in stem-winding watches for the purpose of putting the winding mechanism out of action. The retraction of the stem E must be possible by acting upon the crown C, and therefore the outer stem D, which passes through the shank A, is connected to the said shaft E, so as to move with the same in its axial direction. The said stem D is provided with a lateral opening, in which is lodged a spring D', affixed by means of a screw $d'$ to the stem D. The said spring D' has a hooked end projecting into the square hole of the stem D, into which the square end $e$ of the inner stem E is to be engaged, and the said hooked end of the spring D' engages the circular groove $e'$ of said stem E, as shown in Fig. 1, when the top of the stem D is pressed upon. Now it is evident that when this has been done the retraction of the crown C will cause the inner stem E to be retracted and the hand-setting mechanism to be acted upon. The engagement of the stem D over the stem E is intended to hold the inner case B within the external case A; but the parts must be separated when the case B is to be taken out of the case A. To effect this, the spring D' is provided with a nose or projection $d^3$, projecting into the square central hole of the stem D, and there is a central pin H bearing with its inclined end $h'$ on the said nose or projection $d^3$ and having a collar $h$ lodged in a recess $d^4$ of the stem D and a head or push piece H' lodged in a recess of the crown C and projecting over the top of the latter.

The spring D', acting upon the conical end of the pin H, tends to hold the same in the position shown in Fig. 1; but by depressing the head H' the said conical end of the pin H will cause the spring D' to be pressed laterally into the position shown by dotted lines in Fig. 1 and disengage the hooked end of the spring D' from the circular groove $e'$, so as to allow the stem D to be retracted in the shank A' into the position shown in Fig. 2, in which the said stem D allows the inner case B to be removed from the external case A.

Having thus fully described my invention, I claim—

1. The combination with the outer case and its hollow shank of a removable inner case, a tubular stem passing through the shank and engaging the inner case, a locking-spring to hold the parts in engagement and a central pin through the stem to disconnect the locking-spring, substantially as specified.

2. The combination with the outer case and its hollow shank, of a removable inner case, a tubular stem passing through the shank and engaging the inner case, a locking-spring to hold the parts in engagement, and a central pin through the stem having a conical end to act on the locking-spring and a head to which pressure may be applied to disconnect the locking-spring substantially as specified.

In testimony whereof I have signed my name to this specification in the presence of two subscribing witnesses.

EMILE FLOTRON.

Witnesses:
J. KUPFERSCHMID,
T. MARBACH.